(12) United States Patent
Sekira (10) Patent No.: US 8,201,526 B2
(45) Date of Patent: Jun. 19, 2012

(54) TWO-STROKE INTERNAL COMBUSTION ENGINE

(75) Inventor: Sebastian Sekira, Seeham (AT)

(73) Assignee: KTM Sportmotorcycle, AG, Mattighofen (AT)

( * ) Notice: Subject to any disclaimer, the term of this patent is extended or adjusted under 35 U.S.C. 154(b) by 812 days.

(21) Appl. No.: 12/150,866

(22) Filed: May 1, 2008

(65) Prior Publication Data

US 2008/0283029 A1 Nov. 20, 2008

(30) Foreign Application Priority Data

May 2, 2007 (DE) .......................... 10 2007 020 579

(51) Int. Cl.
  *F02B 25/00* (2006.01)
(52) U.S. Cl. .................................... 123/65 PE
(58) Field of Classification Search .............. 123/65 PE, 123/65 P, 65 V, 322; 92/99
  See application file for complete search history.

(56) References Cited

U.S. PATENT DOCUMENTS

| | | | | |
|---|---|---|---|---|
| 4,364,346 A | * | 12/1982 | Shiohara | ........................ 123/323 |
| 4,672,925 A | * | 6/1987 | Miyata et al. | ............. 123/65 PE |
| 4,723,514 A | * | 2/1988 | Taniuchi | ...................... 123/65 V |
| 5,752,476 A | | 5/1998 | Nakamura | |
| 6,158,215 A | | 12/2000 | Bosch et al. | |
| 6,189,494 B1 | * | 2/2001 | Nagumo et al. | .......... 123/65 PE |
| 6,213,065 B1 | * | 4/2001 | Kahlhamer | ............... 123/65 PE |
| 6,216,648 B1 | * | 4/2001 | Spaulding | ................. 123/65 PE |
| 6,244,227 B1 | | 6/2001 | Matte | |
| 6,418,890 B1 | | 7/2002 | Dopona | |
| 6,886,507 B2 | * | 5/2005 | Olson | ........................ 123/65 PE |
| 2005/0166872 A1 | * | 8/2005 | Zauner | ...................... 123/65 PE |

FOREIGN PATENT DOCUMENTS

| | | |
|---|---|---|
| AT | 399 204 B | 4/1995 |
| AT | 005 299 U1 | 4/2002 |
| CA | 2 355 038 A1 | 2/2003 |
| DE | 37 35319 A1 | 12/1988 |
| DE | 195 35 069 A1 | 3/1996 |
| JP | 405133230 A * | 5/1993 |

* cited by examiner

*Primary Examiner* — Noah Kamen
*Assistant Examiner* — Hung Q Nguyen
(74) *Attorney, Agent, or Firm* — Rod D. Baker (57) ABSTRACT

Disclosed is a two-stroke internal combustion engine comprising a cylinder (2) and a cylinder head (4) releasably secured thereto, the cylinder (2) featuring a main exhaust port (12) and at least one auxiliary exhaust port (13) which can be covered at least in part by means of control slide members actuatable by a slide stem (16) arranged at an angle to a cylinder axis and axially actuated by an actuator (19), and the control slide members are configured integrally with a common control slide (14) coupled to the slide stem (16) and the slide stem (16) penetrating the cylinder head (4).

37 Claims, 10 Drawing Sheets

TWO-STROKE INTERNAL COMBUSTION ENGINE

CROSS-REFERENCE TO RELATED APPLICATIONS

This application claims priority to German Patent Application No. DE 10 2007 020 579.3, filed on May 2, 2007, the entirety of which is incorporated herein by reference.

BACKGROUND OF THE INVENTION

1. Field of the Invention

The present invention relates to internal combustion engines, particularly to two-stroke engines, and specifically to an apparatus and method using control slide members to regulate flow through exhaust ports in the cylinders of such engines 2. Background Art The two-stroke engine involved as background to the present disclosure is a spark ignition internal combustion engine as may be employed, for example, to power a motorcycle or an all-terrain vehicle (ATV) in which scavenging the cylinder occurs via ports provided in the cylinder wall and controlled by the piston.

Such an engine can feature a plurality of scavenging passageways via which a mixture of fuel and air gains access to the combustion chamber of the cylinder, and at least one exhaust passageway via which the exhaust gas can be scavenged from the combustion chamber.

To achieve a high power output by minimizing the flow resistances detrimental to scavenging the exhaust gas, the exhaust port needs to be dimensioned large. Dimensioning the exhaust port large, however, incurs the risk that a piston ring provided on the piston of the engine may get entrapped at the top or bottom metering edge of the exhaust port, resulting in damage to the cylinder bore, or piston ring and the piston respectively. To avoid this problem, the exhaust port can feature a web which helps in preventing the piston ring from becoming entrapped at the edges of the exhaust port due to its guidance of the piston ring. Such a web poses, however, a resistance to flow and, apart from this, is a drawback technically in production.

This is why it is also already known to provide, in addition to the main exhaust port located usually in the direction of travel of the vehicle powered by the engine, auxiliary exhaust ports angularly spaced away from the main exhaust port so that the latter can be configured correspondingly smaller. The smaller configuration lessens the tendency for the piston ring to get entrapped, and nevertheless still makes available in sum larger flow cross-sections for scavenging the combustioned exhaust gas from the combustion chamber.

To improve the performance of such a two-stroke engine by attempting to achieve an ideal type displacement scavenging, without scavenging losses of the new fresh gas, it is known to provide exhaust port control members which cover at least partially the exhaust port of the engine while in the low engine speed RPM range. Such control member use attains by altering the timing of the engine better charging of the cylinder, and thus improving the power and torque response of the engine in the low engine speed RPM range. Such benefits are realized whilst achieving a more ample torque characteristic along the engine speed curve, due to the ability to change the exhaust timing as a function of the engine speed.

For this purpose control slides have already become known, including plate-shaped to cover at least partially the main exhaust port of the engine, and so-called rotary slides configured roller- or barrel-shaped. Rotary slides are used to control the auxiliary exhaust ports of the engine by a rotating motion about their native axis of rotation produced, for example, by means of electric powered servomotors. Unfortunately, a two-stroke engine having such an exhaust control arrangement is complicated in design and accordingly also expensive to manufacture.

To attain a more ample torque curve and high peak power also in the medium and higher RPM speed range of a two-stroke engine provided with such an exhaust control, the control slide members provided in the main and auxiliary exhaust ports are, for example, controllably uncovered to achieve, via a corresponding resonance design of the exhaust portion and in uncovering the exhaust ports, the wanted characteristic whilst nevertheless attaining a more ample increase in the torque curve in the low RPM speed range.

Known already from DE 195 35 069 A1 is a two-stroke engine featuring a curved control slide member to reduce the dead space between the curved cylinder wall and the control slide in the exhaust system because dead space is a disadvantage to the power and torque response of the two-stroke engine. This known two-stroke engine features only one main exhaust port, however.

Known from U.S. Pat. No. 5,752,476 A if a two-stroke engine featuring a control slide member for the main exhaust port and rotary slide members for the auxiliary exhaust ports as already explained above.

Known from AT 005 299 U1 is a two-stroke engine featuring an actuator pressurized by the exhaust gas of the engine, the actuator being arranged in the region of the cylinder of the engine. However, including such a known two-stroke engine in a frame of a known motorcycle would result in the actuator getting in the way of a leading or bracing tube down swept from the steering head tube of the frame towards the road surface.

Known from U.S. Pat. No. 6,244,227 B1 is a valve assembly for exhaust port control of a two-stroke engine actuated by an actuator pressurized by a gas from a pressurized gas source provided for this purpose.

Known from CA 2 355 038 A1 is a two-stroke engine featuring main and auxiliary exhaust ports, each of which can also be uncovered and covered at least partially by separate control slide members. For this purpose a yoke is provided actuated by a gas pressurized actuator to overcome the force of a spring, the main and the two auxiliary exhaust port members being secured to the yoke to actuate first the auxiliary exhaust port members and then the main auxiliary exhaust port member, each independent of the other. In other words, the known control slide member assembly comprises three separate control slide members which thus require three grooves or recesses machined in the cylinder for the control slide members, each configured separately from the other. This necessitates wall and guiding portions in the recesses of the cylinder for guiding the individual control slide members which makes for a complicated and costly production. In addition to this, a plurality of different control slide members needs to be produced, each different from the other and which then need to be assembled in manufacturing the engine.

With the foregoing as background, the present invention was developed and dedicated to eliminating the drawbacks explained hereinabove. The disclosure includes and apparatus and method for defining a two-stroke internal combustion engine comprising, in addition to a main exhaust port, also auxiliary exhaust ports which can be covered at least partially by control slide members, and an innovative control slide provided therefore to greatly simplify manufacture with less complicated production for accommodating the control slide in the cylinder.

SUMMARY OF THE INVENTION

There is disclosed hereby a two-stroke internal combustion engine comprising a cylinder and a cylinder head releasably secured thereto, the cylinder featuring a main exhaust port and at least one auxiliary exhaust port coverable at least in part by means of control slide members actuatable by a slide stem arranged at an angle to a cylinder axis and axially actuated by an actuator.

The disclosure now defines a two-stroke internal combustion engine comprising a cylinder and a cylinder head releasably secured thereto, the cylinder featuring a main exhaust port and at least one auxiliary exhaust port which can be covered at least in part by means of control slide members actuatable by a slide stem arranged at an angle to a cylinder axis and axially actuated by an actuator, whereby the control slide members are configured integrally with a common control slide coupled to the slide stem and the slide stem penetrating or passing through the cylinder head.

For uncovering and covering the exhaust ports at least partly, the control slide members are configured integrally with a common control slide (as by unitary extrusion, milling, or casting, or by permanently fixing members together as by welding), and the slide stem which is coupled to the control slide passes through the cylinder head of the two-stroke engine. Although this arrangement results in a slightly more complicated machining of the cylinder head, it has the advantage over prior art arrangements that an actuator provided for actuating the control slide now no longer gets in the way of a frame tube of the motorcycle, otherwise requiring complicated modifications to the motorcycle frame. Further, the integral configuration of the control slide ensures that instead of a plurality of accommodating locations, a single common accommodating location needs to be machined in the cylinder without intermediate grooves or the like, thus making it simpler to manufacture than having to produce a plurality of accommodating locations—each separate from the other for separate control slide members for the main exhaust port and the auxiliary exhaust ports. All in all, this simplifies machining the cylinder.

In one further embodiment of the disclosed apparatus it is provided that the control slide has a main member curved to substantially correspond to the curvature of the cylinder bore. Integrally connected to the main member are auxiliary members configured substantially straight, that is, having substantially planar faces. Thus the entire body of the main member, which partly covers and uncovers the main exhaust port, has a curvature corresponding generally to that of the cylinder bore, avoiding dead spaces between the main member and the exhaust port detrimental to performance. The auxiliary members configured integral with the main member are configured substantially rectilinearly, at least with generally planar principal faces. The main member is thus curved to substantially correspond to the curvature of the cylinder bore.

This not only facilitates manufacturing the control slide, produced for example as an extruded or cast part, it also results in a beneficial reduction in the "wrap angle" of the control slide relative to the cylinder of the engine. A large wrap angle obstructs forming the passageways for cooling the engine; thus, a large wrap angle compels a reduction in the volume of the exhaust portion of the engine, at the expense of efficient cooling of that highly thermally stressed portion of the engine. A larger wrap angle also results in an excessively large contact surface between the slide and the accommodating location, increasing the tendency of the slide to stick in the accommodating location due to machining tolerances. Avoiding this in turn necessitates even more complicated production. Additionally, the resulting long circumferential recess in the cylinder wall results in an increased tendency of the cylinder to distort, as it necessarily has to be free of stiffening ribs.

In another further embodiment of the disclosed apparatus it is provided for that the main member and auxiliary members are configured with different heights in relation to the upright axis. Thus, the main member has a different height dimension than the height dimensions of the auxiliary members; typically but not necessarily, the main member is substantially taller than either of the auxiliary members. This results in that, as compared to the multi-part control slides known in the art, the mass of the control slide in accordance with the disclosure is reduced, substantially improving the response of the two-stroke engine in accordance with the disclosure as compared to that as known, since the control slide in accordance with the disclosure presents a moment of mass inertia to be overcome in actuation by the actuator which is lower than is the case with the known plate-type multi-part control slide.

In another aspect of the present disclosure it is provided for that each of the auxiliary members, which ordinarily are situated on either lateral side of the main member, is provided at its portion facing away from the main member with a surface connecting a front face and a rear face of the auxiliary member, the surface having a center of curvature between the front face and rear face. The front and rear faces of each auxiliary member preferably are substantially planar. This means that the auxiliary members now feature a curved or rounded end that connects the front face and the rear faces thereof, at the outer portion facing away from the main member. The curved end reduces any tendency of the control slide to stick in its recess in the cylinder. This is also significant because the two-stroke engine in accordance with the present disclosure is run on a fuel/oil mixture, and the combustioned oil constituents tend to produce deposits in the exhaust portion. With a control slide configured solely with straight surfaces and sharp edges in the region of the auxiliary members, these deposits could result in the control slide sticking in its recess in the cylinder as is the case, for example, with the multi-part control slide as described previously above. Apart from this, sharp edges increase wear due to its line contact.

As mentioned above, the auxiliary members configured integral with the main member are practically straight, that is, they have substantially planer principal faces. In accordance with yet another further embodiment of the disclosed apparatus, it is provided for that the intersection of a plane tangential to a front face of the auxiliary member, located in the direction of the main exhaust, with a second plane containing both the center of curvature of the main member and the longitudinal centerline of the slide stem, defines or covers an angle in the range of approximately 55 degrees to approximately 90 degrees. When, for instance, the upright axis of the cylinder in the longitudinal direction of the two-stroke engine coincides with the longitudinal centerline of the slide stem, then center of curvature of the main member is located in this plane and the longitudinal centerline of the slide stem defines an angle of approximately 55 to approximately 90 degrees from the aforementioned tangential plane at the front face of the auxiliary member. In a preferred embodiment, this angle preferably is about 85 degrees, for example. Such an angle helps to minimize the aforementioned dead space in the exhaust portion of the cylinder, optimize locating the bolting for securing the cylinder head to the cylinder, arrange advantageously the coolant jacket configured in the cylinder, configure a cylinder head gasket wide enough for sealing the portion between the cylinder and the cylinder head, and simplify machining the cylinder and cylinder head.

In still another further embodiment of the disclosed apparatus it is provided for that the longitudinal centerline of the cylinder and the longitudinal centerline of the slide stem define an angle in the range of approximately 10 degrees to approximately 45 degrees, particularly approximately 13 degrees to approximately 16 degrees. It is achieved by this configuration that the actuator provided to actuate the control slide and its stem can be arranged in the region of the cylinder head. This avoids, for example, a motorcycle frame location between the longitudinal centerline of the cylinder and the front wheel of a motorcycle, in which the actuator would get in the way of a frame's leading or bracing tube down swept from the steering head tube of the frame towards the road surface. A costly design and production of the motorcycle frame thereby is avoided. In addition to this, the cited angular range ensures that any increase in the size of the aforementioned dead space in the main exhaust port when uncovering the exhaust slide detrimental to performance is reduced. Although this arrangement makes for a slightly more complicated machining of the cylinder head, it results in substantial power and torque advantages in the two-stroke engine configured as such.

The control slide provided in accordance with the present disclosure is actuated in the axial direction of its stem, in other words unseated and seated axially in a hole or recess accommodating the stem. To avoid the control slide tilting therein in the cylinder whilst taking into account the deposits in the exhaust as aforementioned, it is also provided for in accordance with the present disclosure to achieve axially longitudinal guidance of the control slide at a cylindrical portion of the stem configured only at a partial portion of the length of the stem. For this purpose, it is provided for in another further embodiment of the disclosed apparatus that the control slide is topped by a male threaded pin-shaped portion, at which the slide stem is definable with a female threaded shell-shaped portion. This means, that the shell portion of the stem simultaneously has the function of guiding the stem, and thus the control slide, axially longitudinal in its recess in the cylinder. Guiding the slide is thus handled by the cylindrical portion and the slide member, including its main member and auxiliary members having sliding contact with the recess solely to preventing its turning out of place and, therefore, substantially reducing the risk of it sticking.

Since the shell portion is provided over only a portion of the length of the slide stem, there is also no need to configure over its full length the hole accommodating the stem (in the cylinder) to form a sliding seat between the shell-shaped portion and the accommodating hole. Rather, such a configuration of the stem hole need be made over only a portion or segment of the stem hole's length, further simplifying manufacture. For example, in the portion outside of the portion which is attained in the motion of the stem in its accommodating hole from the shell-shaped portion, the accommodating hole can be simply produced—for example, with a larger diameter without the tolerance situation between the slide stem and the hole being of any significant importance. The accommodating hole to be machined precisely in the portion of the longitudinal guide is also much more cost-effective to produce than a curved accommodation for the sliding member, which requires a comparatively high precision in manufacture.

The auxiliary exhaust ports in the wall of the cylinder feature, in the direction of the upright axis of the cylindrical shell surface, a much smaller longitudinal extent than that of the main exhaust port. To minimize the mass of the control slide to be actuated by the actuator, it is provided for in yet another further embodiment of the disclosed apparatus that the main member is upswept starting from the auxiliary members in the direction of the slide stem. More specifically, a top surface of the main member is upswept from an auxiliary member and toward the slide stem. Thus the auxiliary members are not as high as the main member, and thus can partly cover the auxiliary exhaust ports whilst (unlike known multipart control slides as described above) now presenting a much smaller inertial mass to counter a motive force from the actuator.

In another further embodiment of the disclosed apparatus it is, however, also provided for that, in relation to the upright axis of the main member, (defined along the direction of the longitudinal centerline of the main member), the auxiliary members protrude from the main member at any position. The height elevation of the juncture of each auxiliary member with the main member accordingly can be practically anywhere along the vertical height of the main member, particularly in those embodiments where the auxiliary members have height dimensions substantially less than the overall height dimension of the main member. Indeed, the auxiliary members may protrude beyond a top, or bottom, surface of the main member. This enables the timing of the two-stroke engine in accordance with the present disclosure to be modified, by modifying the uncovering and covering angle of the auxiliary exhaust ports relative to the main exhaust port.

In accordance with yet another further embodiment of the disclosed apparatus, it is provided for that the actuator is provided in the region of the cylinder head and configured for accommodating a gas pressure and coupling with the slide stem. Pressurizing the actuator by the gas pressure can then be done by means of the exhaust gas from the two-stroke engine in accordance with the present disclosure, and for this purpose the actuator is fluidly communicatingly connected to an exhaust portion and/or an exhaust system of the engine.

With increasing engine RPM speed the mass flow of the exhaust gas increases and this exhaust gas pressurizing the actuator results in the actuator pulling the integral control slide from the portion of the main exhaust port and the auxiliary exhaust ports which directly influences the power characteristic and torque characteristic of the two-stroke engine. This power and torque response needs to remain practically constant despite the running life of the engine, and any soilage existing in the exhaust portion due to deposits and the like. To thus attain such a consistent response of the two-stroke engine in accordance with the present disclosure, it is provided for that the actuator features two piston faces which urge the slide stem in overcoming the effect of a spring means to uncover the exhaust ports.

Both piston faces can now be pressurized via the exhaust gas, creating in this way (compared to a single piston face) for the same corresponding dimensions twice the force with which the actuator actuates (imparts activating force to) the slide stem. This also enables the spring means to be configured with a correspondingly larger spring constant with no change in the stroke of the slide stem (i.e., to select a "harder" spring). Since this results in a larger force being available in uncovering and covering the exhaust ports, changes in the friction conditions in the recess of the control slide and the hole accommodating the slide stem have a significantly smaller effect, as compared to the absolute level of the force, than with a low force. This in turn results in changes in the friction conditions materializing in the exhaust portion of the two-stroke engine in accordance with the present disclosure having less effect upon the power and torque response than a lower force needed to actuate the slide stem. This makes possible that the disclosed engine achieves a reproducible response independent of its running life, and any deposits and unavoidable machining tolerances in manufacturing the control slide and its recess (or also the spring), which in turn results that the control slide and the recess can now be machined with greater tolerances to reduce costs.

The aforementioned actuator features a housing with two pressure chambers juxtaposed by expansion chambers for venting and/or negative pressurizing which when pressurizing the pressure chambers with a gas pressure from, for example, the exhaust port of the engine in accordance with the present disclosure into the ambient surroundings in thus not presenting any unwanted resistance to a shifting of the two piston faces. In one embodiment, however, the expansion chambers can also be subjected to a negative pressure and to be connected, for example, to the intake air portion of the two-stroke engine in accordance with the present disclosure by being fluidly communicatingly connected. Because of the intake action of the two-stroke engine, there exists in the intake air portion a pressure which is smaller as compared to ambient pressure. By being fluidly communicatingly connected (which may include a restrictor), this smaller pressure continues into the expansion chambers in ensuring that even a small pressure existing in the exhaust portion and/or in the exhaust tract of the two-stroke engine is adequate for a reproducible actuation of the control slide. The cited restrictor ensures that changes in pressure in the intake air portion, prompted by a throttle featuring a different opening angle or a carburettor slide valve uncovering different intake cross-sections, have little or no effect on the pressure conditions in the expansion chambers. Thus the pressure in the chambers remains practically independent of the pressure in the intake air portion.

In accordance with still another further embodiment of the disclosed apparatus, it is provided for that the two pressure chambers feature flexible pressure diaphragms disposed between pot-shaped housing members and a partition of the actuator arranged between the pressure chambers. The diaphragms are supported by piston faces, sited at a first and a second piston, the pistons coupled to move together to actuate the slide stem. The pressure of the exhaust gas thus can act on the pressure diaphragms which pressure the first and second pistons into an axial motion in the actuator, to thus impart force upon and actuate the slide stem in its accommodating hole. The resulting axial motion of the slide stem in turn actuates the control slide.

The cited pressure diaphragms can be made of a methyl vinyl silicone rubber, particularly fluorosilicone rubber fluoromethyl polysiloxane, to comply with and withstand the engine constituents and oils, as well as temperatures existing in the exhaust gas of the engine. Diaphragms of such compositions also have substantially better soak-resistant properties respecting mineral and synthetic oils in fuels, to attain a reproducible response of the two-stroke engine in accordance with the present disclosure.

The recess provided for accommodating the control slide in the cylinder is, in accordance with another further embodiment of the disclosed apparatus, machined substantially complementary in shape and size to the control slide, and the recess is connected by a hole to accommodate the slide stem. Integrally configuring the control slide enables the recess in the cylinder to be configured without having to arrange guide grooves in the cylinder for multipart control slide members—as is the case in the known arrangements. Instead, it permits simple machining in production without intermediate webs and the like being necessary.

In a preferred embodiment of the apparatus of the present disclosure, in the upright axis of the cylinder the lower metering edge of the auxiliary exhaust port is arranged substantially level with the lower metering edge of the main member of the control slide, when the latter is not actuated (i.e., is in the non-actuated position). In such an embodiment, the lower metering edges of the auxiliary members of the control slide are located level with the lower metering edge of the main member of the control slide, so that correspondingly actuating the control slide actuates both the lower metering edges of the main member as well as the lower metering edges of the auxiliary member. This allows simultaneously uncovering of the auxiliary exhaust ports and of the main exhaust port.

As already commented, the longitudinal centerline (or axis) of the slide stem defines an angle of approximately 10 to approximately 45 degrees with the longitudinal centerline of the cylinder. This results in that when the main exhaust port is fully uncovered, the underside of the main member of the control slide protrudes, now as then, slightly into the main exhaust port in thus presenting a resistance to the flow in scavenging the exhaust gas from the combustion chamber of the two-stroke engine. To avoid this, it is provided for in another further embodiment of the presently disclosed apparatus that the main exhaust member of the control slide features at the lower metering edge a recess, the upsweep of which is reduced in the direction of the exhaust, such that the lower metering edge is substantially flush with an upper edge of the main exhaust port. This eliminates the problem of the aforementioned flow resistance when the main exhaust port is uncovered.

In accordance with a further embodiment of the presently disclosed apparatus, it is provided for that the actuator features only one gas pressurized piston actuating the slide stem and which can be actuated by means of exhaust gas of the engine and/or a gas pressurized in a crankcase of the engine. For this purpose the actuator can be pressurized, for example, additionally with the pressure in the crankcase of the engine in thus making it possible to vary the spring constant of the spring which maintains the control slide in its normal covering position.

In accordance with one modified embodiment it is also provided for that the actuator is an actuator powered electrically and/or mechanically, i.e. for example by means of centrifugal force, actuating the control slide from its position partly covering the main exhaust port and/or auxiliary exhaust ports.

BRIEF DESCRIPTION OF THE DRAWINGS

The accompanying drawings, which are incorporated into and form a part of the specification, are for the purpose of illustrating a preferred embodiment of the invention, and are no to be construed as limiting the invention. The present disclosure will now be detailed with reference to the drawings, in which.

DESCRIPTION OF THE PREFERRED EMBODIMENTS

Best Mode for Practicing the Invention

Figure 1:
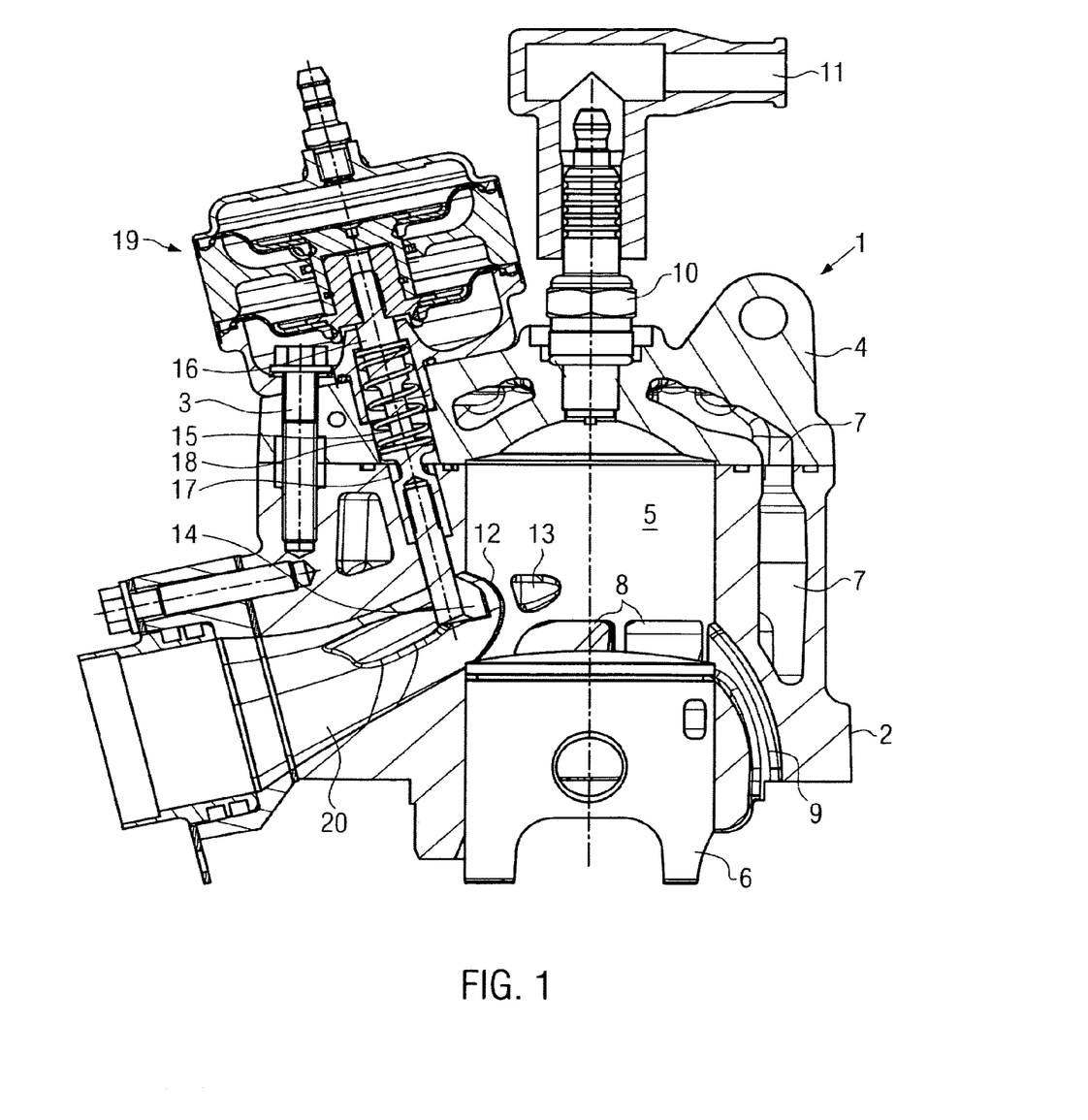
FIG. 1 is a section I-I as shown in FIG. 3, depicting an embodiment of the two-stroke engine in accordance with the present disclosure.
Figure 3:
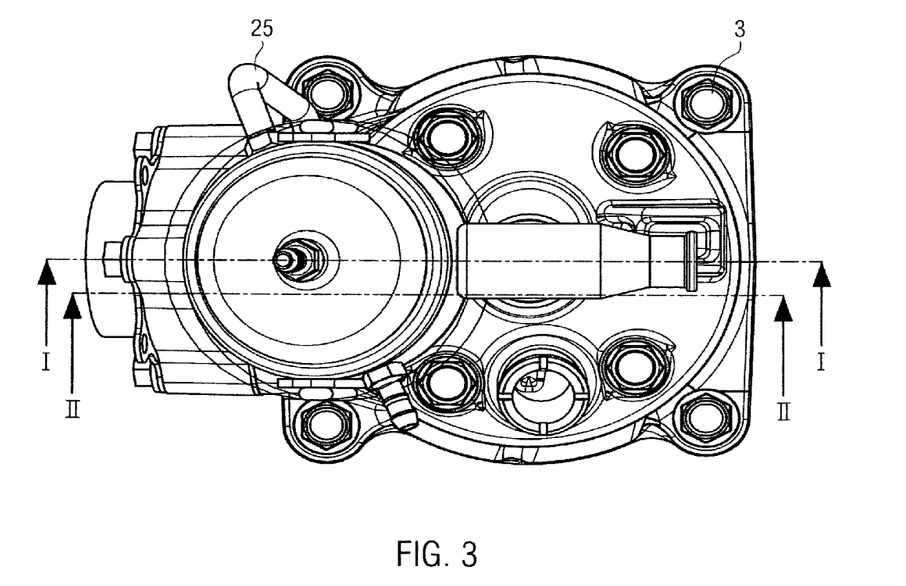
FIG. 3 is a plan view of the embodiment of the two-stroke engine.

Referring now to FIG. 1, there is illustrated a section view taken in the section direction I-I as shown in FIG. 3. The two-stroke internal combustion engine 1 as shown comprises a cylinder 2 and a cylinder head 4 releasably secured thereto by means of cylinder head bolts 3 as shown in FIG. 3. As described, the engine in has a main exhaust port and at least one auxiliary exhaust port coverable, at least in part, by control slide members actuatable by a slide stem arranged at an angle to the cylinder axis and axially actuated by an actuator. The longitudinal centerline of the cylinder 2 and the longitudinal centreline of the slide stem 16 are depicted in FIG. 1; preferably, they intersect to define an angle in the range of approximately 10 degrees to approximately 45 degrees, or even more preferably, the range of approximately 13 degrees to approximately 16 degrees. In the preferred embodiment, the control slide members are configured integrally with a common control slide, the common control slide being coupled to the slide stem; and the slide stem passes through the cylinder head.

Machined in the cylinder 2 is a bore 5, along which a piston 6 can reciprocate between a top dead-center and bottom dead-center. The cylinder 2 and the cylinder head 4 feature coolant passageways 7 for a circulated coolant which removes the heat given off by a heat exchanger (not shown).

Machined in the wall of the cylinder 2 forming the bore 5 are intake ports 8, so-called transfer passages—four of which are provided in the present case along the periphery of the shell surface of the bore 5—for introducing fresh gas into the combustion chamber of the cylinder 2. In a similar way, fresh gas can be introduced into the combustion chamber by a rising passageway or supporting passageway 9, this fresh gas delivery due to the supporting passageway 9 being oriented in the direction of the cylinder head 4; this ensures that the fresh gas introduced by the intake ports 8 is directed upwards, to achieve return scavenging such that the introduced fresh gas is reversed by the roof of the combustion chamber formed in the cylinder head 4. The roof or top of the combustion chamber is closed off by a spark plug 10, which is provided with a spark plug connector 11.

It is this return flow that ensures that the combustioned exhaust gas can be scavenged from the combustion chamber of the cylinder 2 via a main exhaust port 12 and two auxiliary exhaust ports 13. (Only one exhaust port 13 is shown in FIG. 1 due to the selected section view.)

Figures 4, 5:
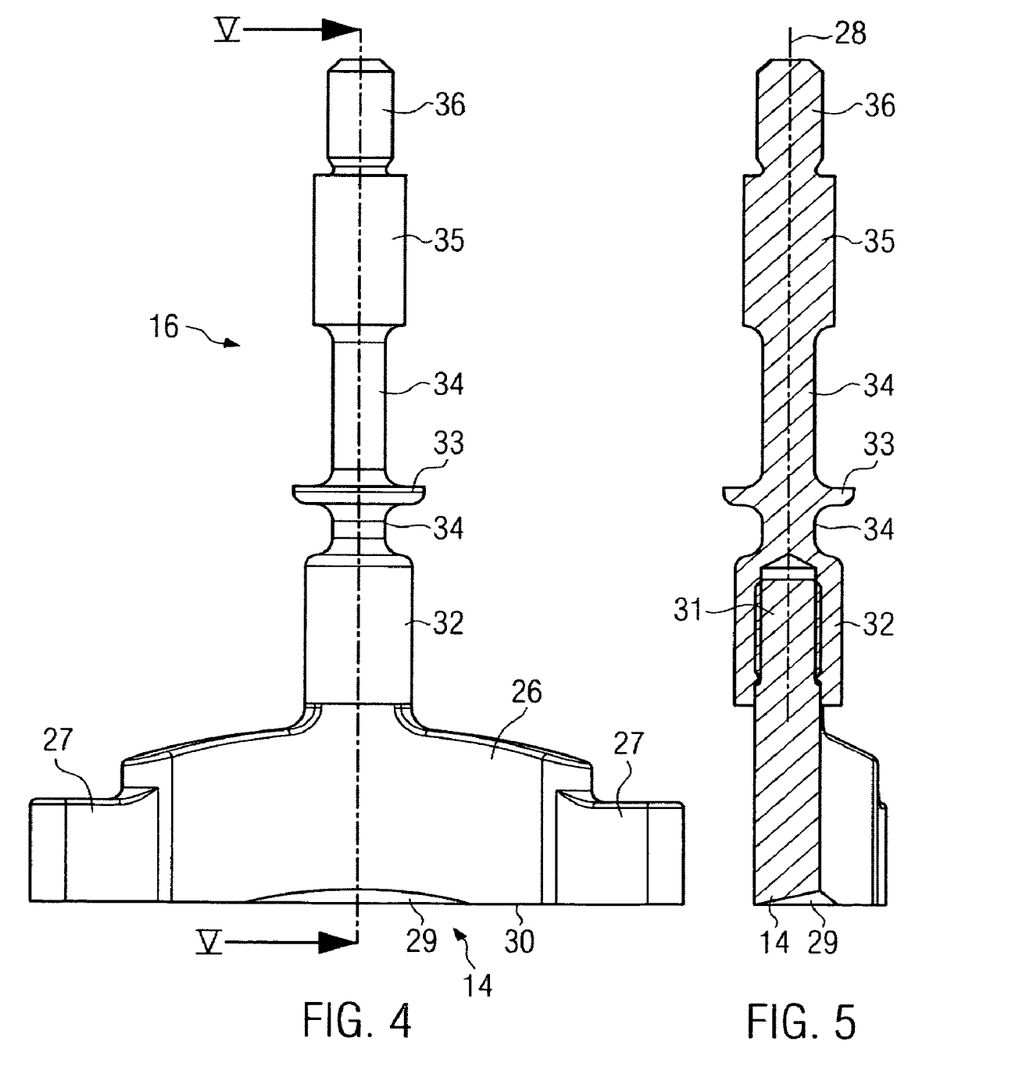
FIG. 4 is a front view, in the direction of the main exhaust port, of a control slide of the two-stroke engine in accordance with the present disclosure.
FIG. 5 is a sectional view of the control slide taken along section line V-V of FIG. 4.

Referring now to FIGS. 4 and 5 of the drawings, there is illustrated in more detail how a control slide 14 covers at least in part the main exhaust port 12 and auxiliary exhaust ports 13, to significantly improve the power and torque response of the two-stroke internal combustion engine 1 (i.e., achieving more ample power and torque curves, as compared to an internal combustion engine having no control in the exhaust portion.)

Referring again to FIG. 1, there is illustrated the control slide 14 in its lower position, i.e. in partly covering both the main exhaust port 12 and the auxiliary exhaust ports 13.

The control slide 14, featuring a slide stem 16 actuated by a spring 15, is releasably connected by means of bolting as shown in more detail in FIG. 5. In this arrangement, the slide stem 16 penetrates an accommodating hole 17 drilled in the cylinder 2 and a corresponding accommodating hole 18 drilled in the cylinder head 4. The slide stem 16, actuated by an actuator 19 powered by gas pressure, is releasably secured to the cylinder head 4 by means of a cylinder head bolt 3.

Figure 2:
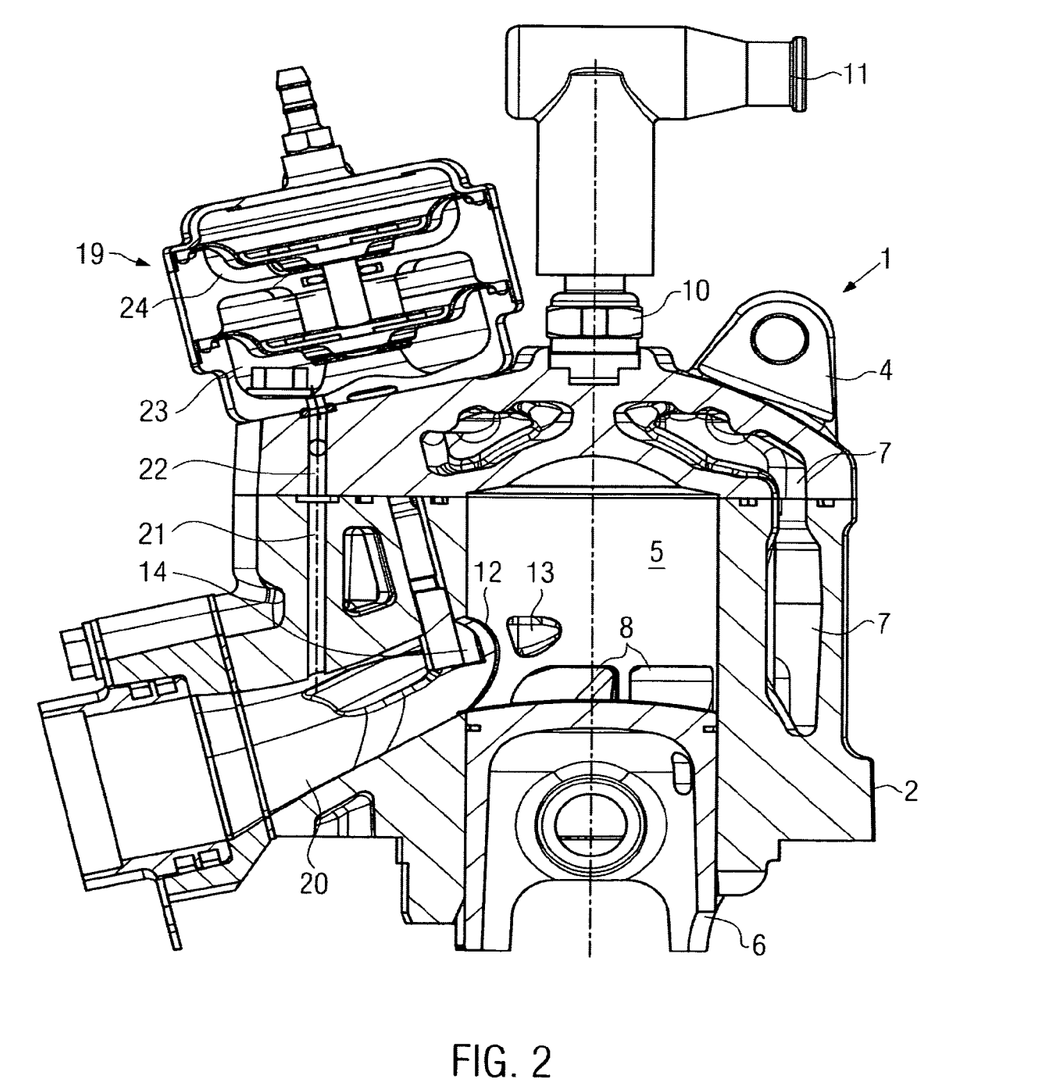
FIG. 2 is sectional view similar to FIG. 1, taken along the section line II-II as shown in FIG. 3.

The exhaust gas formed by the combustion in the cylinder 2 is scavenged by the flow of fresh gas introduced via the overflow port 8 and the supporting passageway 9. Still referring especially to FIG. 1, the fresh flow from the overflow port 8 and the passageway 9 increases the pressure in the exhaust passageway 20. Branching off the exhaust passageway 20 is a fluidly communicating connection or pressure conduit 21 machined in the cylinder 2. The pressure conduit 21 is connected to a corresponding pressure conduit 22 in the cylinder head 4 of the engine 1. The pressure existing in the exhaust passageway 20 progresses via the pressure conduit 21 and pressure conduit 22 in the direction of the actuator 19, where it pressurizes a first pressure chamber 23 (FIG. 2). The first pressure chamber 23 connects a second pressure chamber 24 machined in the actuator 19 via an outer pressure conduit 25, shown in further detail in FIG. 3. It is in this way that the pressure existing in the exhaust passageway 20 may pressurize the two pressure chambers 23, 24, in each of which a piston with a pressure diaphragm acting thereon is arranged as is evident in more detail from FIGS. 6 and 7.

The exhaust gas pressure existing in the exhaust passageway 20 ensures that the control slide 14 can overcome the effect of the spring 15, and rise within the cylinder 2. When the pressure increases in the exhaust passageway 20 (typically and especially when the engine speed RPM of the engine 1 increases), the pressure imparts a force on the control slide 14 until the control slide 14, having fully uncovered the main exhaust port 12 and the auxiliary exhaust ports 13, is in its top position, releasing flow of the exhaust passageway 20 from the main exhaust port 12 and auxiliary exhaust ports 13.

Referring now to FIG. 4, there is illustrated on a magnified scale the control slide 14 including the slide stem 16 arranged thereon. The control slide 14 comprises a main member 26 whose body contours are configured curved to comply or conform with the curvature of the barrel 5 and wall of the cylinder 2 respectively. Auxiliary members 27 are integrally connected to the main member. Thus, the main member 26 has a center of curvature whereby the main member is configured curved, substantially corresponding to the curvature of the cylinder, whilst the auxiliary members are integrally connected to the main member but have substantially planar faces. In the preferred embodiments, the main member 26 is between the auxiliary members 27, while each auxiliary member has a planar a front face 47, a rear face 48, and a curved surface facing away from the main member 26 and connecting the front face and a rear face, the curved surface having a center of curvature between the front face and rear face. It also is noted from FIG. 4 that the main member 26 and auxiliary members 27 have differing respective height dimensions (height being gauged relative to the upright axis). The auxiliary members 27 in the preferred embodiments are substantially shorter in height dimension that the main member 26.

As directly evident from FIG. 4, the auxiliary members 27 may be machined lower (in the direction of the longitudinal centerline 28 of the slide stem 16 or upright axis of the main member 26) than the main member 26. The auxiliary members accordingly may create, for actuating the control slide 14, an opposing moment of inertia lower than is the case with multipart control slides known in the art.

Referring now to FIG. 5, there is illustrated how the main member 26 comprises at its lower metering edge 30 an arcuate recess 29 which decreases height in the direction of the main exhaust. This declining depth of the recess 29 helps ensure that the lower metering edge 30 of the main member 26 of the control slide 14 ends substantially flush with the upper edge of the main exhaust port 12, when the latter is uncovered in representing no resistance to flow.

The control slide 14 is topped by a pin-shaped portion 31—again as evident from FIG. 5 of the drawings—having a male thread for releasably mating with a female thread machined in a shell-shaped portion 32 of the slide stem 16. This shell portion 32 simultaneously serves to longitudinally guide the slide stem 16 in the accommodating hole 17 in the cylinder 2. Machined above the shell-shaped portion is a plate-shaped counterhold 33 for the spring 15 as shown in FIG. 1. Referring to FIG. 5, the slide stem 16 features, both above and below the plate-shaped counterhold 33, segments of smaller outer diameter than in the portion of the shell-shaped portion 32. Via these two portions 34 having a smaller outer diameter than in the shell-shaped portion 32, oily exhaust gas has access to the portion of a cylindrical portion 35 at the slide stem 16, at which the latter is guided axially in the actuator 19; this portion is simultaneously supplied with a film of lubricant sufficient for low-friction motion of the slide stem 16. Provided above the cylindrical portion 35 is a male threaded portion 36 of the slide stem 16, with which it can be screwed into a female threaded hole tapped in a piston of actuator 19.

Figure 6:
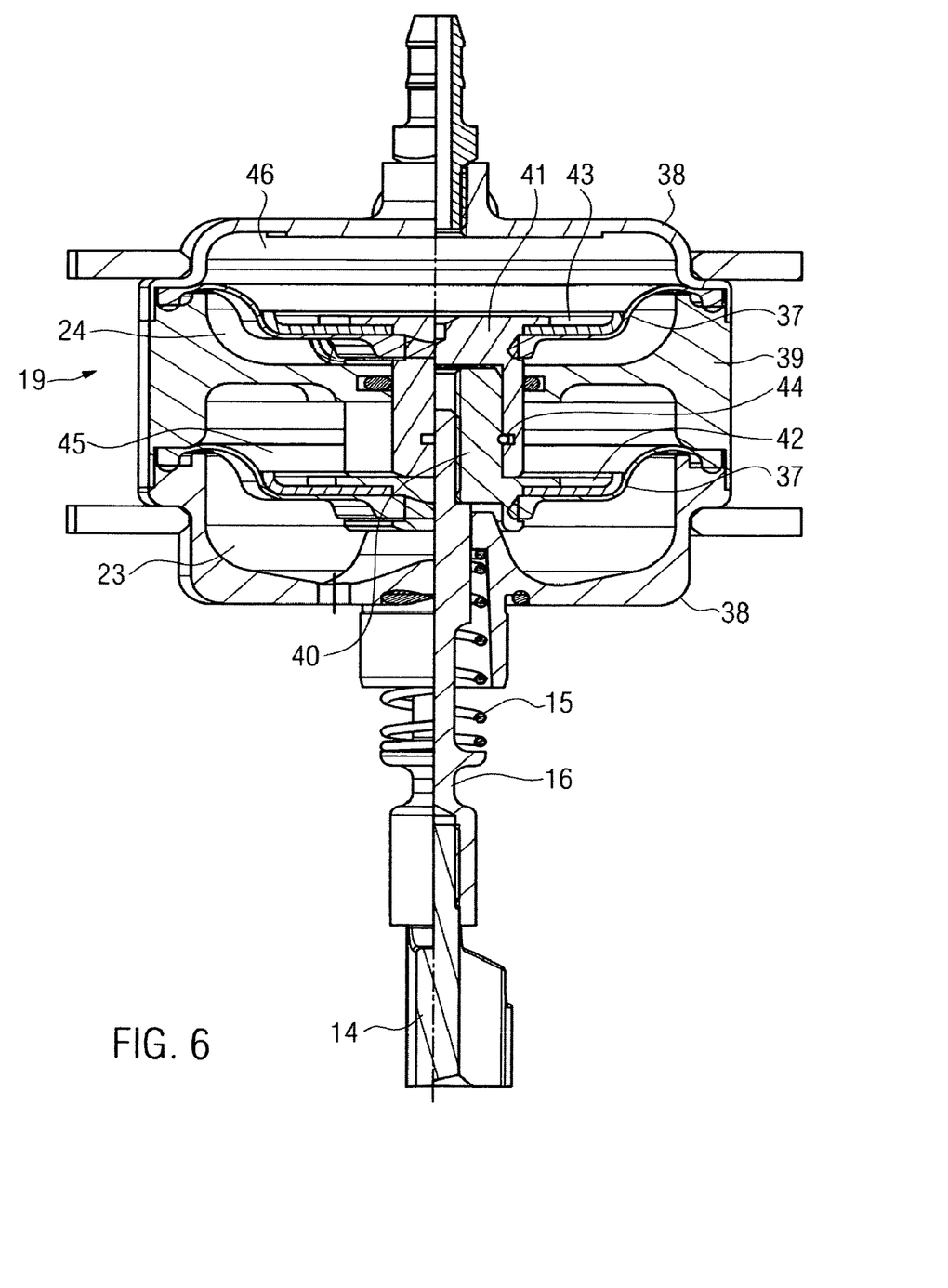
FIG. 6 is a partial sectional view through an actuator according to the present disclosure, including the slide stem with the slide member in a position partly covering the exhaust ports.
Figure 7:
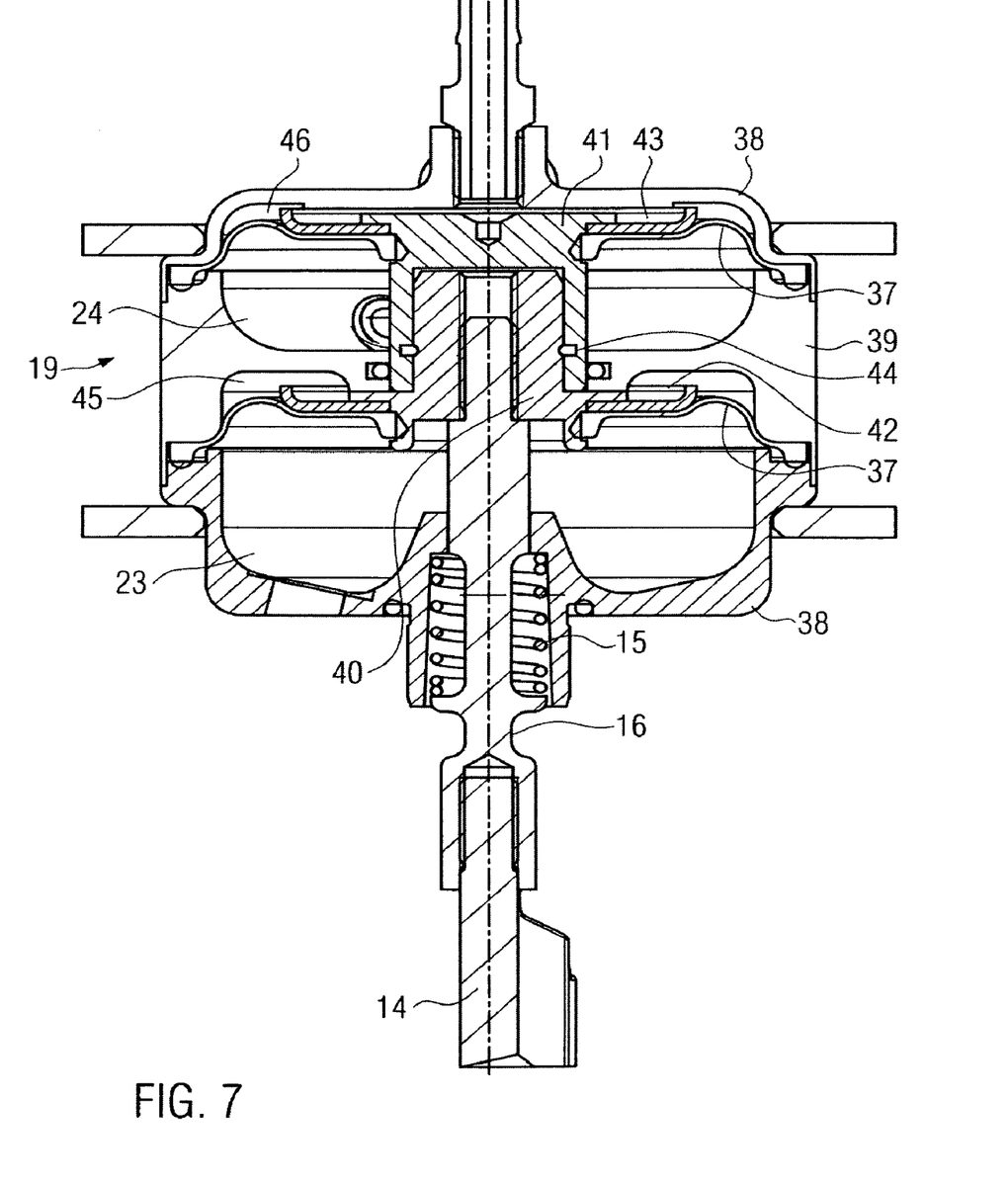
FIG. 7 is a view similar to that of FIG. 6, showing the direction of actuation with the control slide shown in the uncovering position.

Referring now to FIGS. 6 and 7 of the drawings, there are illustrated section views of the actuator 19, including arranged thereon the slide stem 16 as well as the control slide 14. FIG. 6 shows a position in which the slide stem 16 is in a lowered position, in which it partly covers the main exhaust port 12 and auxiliary exhaust ports 13. FIG. 7 shows a position in which the slide stem 16 is in a raised position to uncover the main exhaust port 12 and auxiliary exhaust ports 13.

The actuator 19 comprises a first pressure chamber 23 and a second pressure chamber 24, both of which can be pressurized by the pressure from the exhaust passageway 20. The exhaust gas pressure existing in the two pressure chambers 23, 24 pressurizes pressure diaphragms 37 situated in each pressure chamber. The diaphragms 37 are preferably made of a fluorosilicone rubber fluoromethyl polysiloxane having, for example, a Shore hardness of 60. The diaphragms are sealingly clamped in place between pot-shaped housing members 38 and a partition 39, the partition being disposed between the pressure chambers 23, 24. In their radial inner portions, the two pressure diaphragms 37 contact a first lower piston 40 and a second upper piston 41 in thus forming the two pressure chambers 23, 24. In this arrangement, the diaphragms 37 contact a first piston face 42 of the piston 40 and a second piston face 43 of the piston 41. The pistons 40, 41 are releasably connected to each other by a circlip 44 situated in a suitable groove, so that the pistons move together to actuate the slide stem 16.

Formed above the first pressure chamber 23 is a first expansion chamber 45 in the actuator 19, a second expansion chamber 46 being formed similarly above the second pressure chamber 24. The second expansion chamber 46 communicates, by a conduit in the form of the port as shown in FIGS. 6 and 7, for example, at the top of the housing members 38 and by a further port (not shown), with the ambient air in thus not opposing actuation of the two pistons 40, 41 by a pressure space.

Figure 8A:
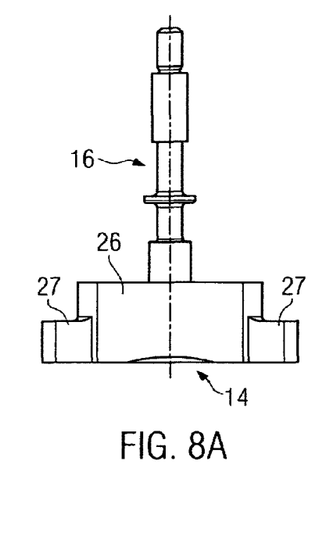
FIGS. 8A, 8B, and 8C are front views of various example embodiments of the control slide.
Figure 8B:
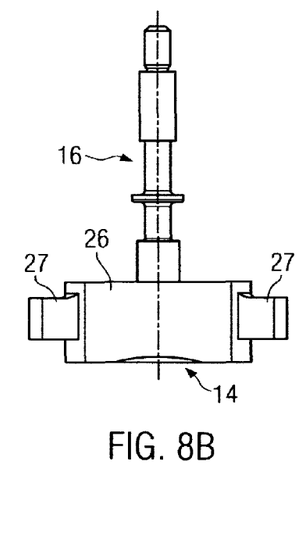
Figure 8C:
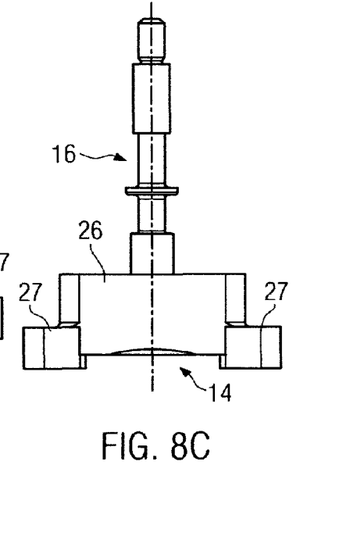

Referring now to FIGS. 8A, 8B and 8C, there are illustrated various embodiments of the control slide 14 and its slide stem 16. The embodiment as shown in FIG. 8A is an embodiment similar to that as shown in FIGS. 1 to 7, in which the auxiliary members 27 end flush with the main member 26 by their lower metering edge. FIG. 8B shows an embodiment in which the auxiliary members 27 comprise a lower metering edge which differs from that of the main member 26 by the auxiliary members 27 being higher, in relation to the upright axis of the main member 26 and of the longitudinal centerline 28 of the slide stem 16 respectively. In a similar configuration as shown in FIG. 8C of a modified embodiment of the control slide 14, the auxiliary members 27 are situated lower, downwards along or relative to the longitudinal centerline 28 of the slide stem 16, resulting in differing lower metering edges being formed. Collectively considered, FIGS. 8A-8C illustrate how the auxiliary members 27 may protrude from the main member 26 at any position in elevation relation to the upright axis of the main member. Indeed, the auxiliary members 27 protrude below a bottom surface of the main member 26.

Figures 9A, 9B:
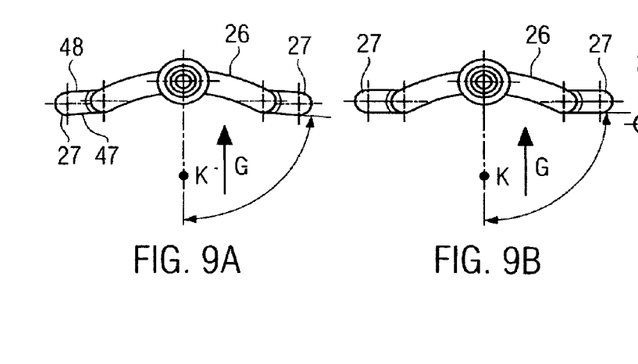
FIGS. 9A, 9B, and 9C are plan views of various example embodiments of the control slide.

Referring now to FIG. 9A, there is illustrated in a top-down view an embodiment of the control slide 14 as is shown before in FIG. 4 of the drawing. As there seen, the control slide 14 has a main member 26 configured curved, and auxiliary members 27 machined "straight" with substantially planar principal faces, integrally connected with the main member 26. In this arrangement the auxiliary members 27 comprise a front face 47 located at the front in the direction of the gas flow from the cylinder 2 (as indicated by the arrow G) and a downstream rear face 48. An imaginary tangential plane formed at the front face 47 (with the front face 47 of the auxiliary member 27 located in the direction of the main exhaust G), intersects a second, imaginary plane containing the center of curvature K of the main member 26 and the longitudinal centerline 28 of the slide stem 16, to define an angle ranging up to and preferably about 85 degrees. This angular range has proven to be of advantage as regards the position of the dead space between the control slide 14 and the barrel 5, in which the exhaust gas can collect, as regards the cylinder head bolting, the coolant jacket, cylinder head gasket and for example, also as regards machining the cylinder.

Figure 9C:
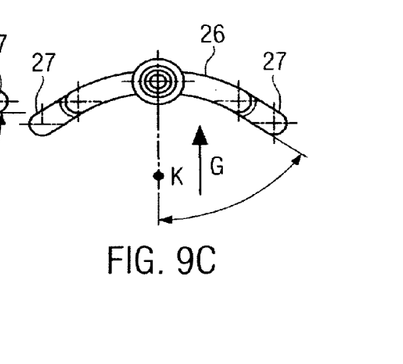

Referring now to FIG. 9B there is illustrated an embodiment similar to that as shown in FIG. 9A, in which the angle defined between the tangential plane to the front face of the auxiliary member 27 (as just described) and the plane containing the center of curvature K and the longitudinal centerline 28 is approximately 90 degrees. Or, as shown in FIG. 9C, this angle alternatively may also be approximately 55 degrees; the auxiliary members 27 in this embodiment of the control slide 14 forming a substantially straight continuation of the main member 26 configured curved, with the faces 47, 48 being planes tangent to the curved surface on each distal side of the main member 26. Accordingly, an imaginary plane tangential to a front face of an auxiliary member 27 located toward the main exhaust port intersects a second imaginary plane containing the center of curvature K of the main member 26 and a longitudinal centerline of the slide stem 16, and these the planes define an angle in the overall range of approximately 55 degrees to approximately 90 degrees.

Figure 10:
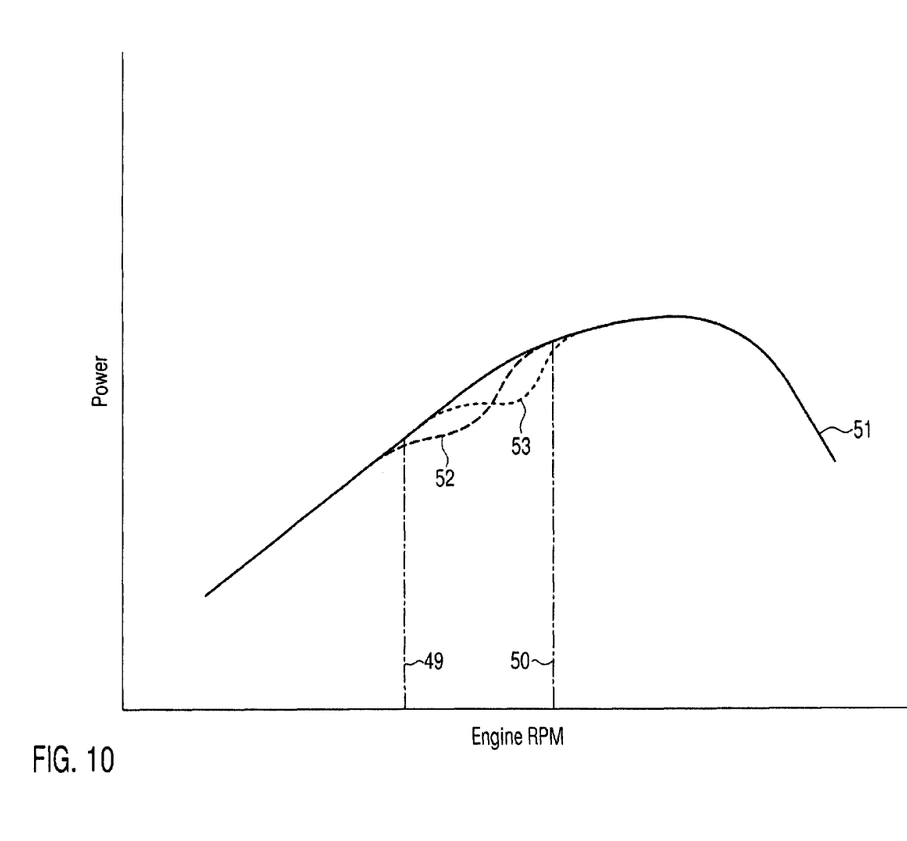
FIG. 10 is a graph plotting various power curves of the two-stroke engine with embodiments of the control slides as shown in FIGS. 8A, 8B and 8C.

Referring now to FIG. 10, there are illustrated qualitative power curves of the two-stroke engine making use of various control slides as shown in FIGS. 8A, 8B and 8C. The vertical dot-dashed line 49 plots, relative to the curve 51, the engine speed RPM at the start of the auxiliary exhaust ports 13 being uncovered. The vertical dot-dashed line 50 plots the engine speed RPM at which the auxiliary exhaust ports 13 are fully uncovered. The bold curve 51 plots the power, relative to the engine speed RPM, when using the control slide as shown in FIG. 8a; thus curve 51 indicates the continual increase in power of the two-stroke engine. When a power characteristic is wanted as plotted by the broken line 52 for soft starting, a control slide can be employed as shown in FIG. 8B, in which uncovering of the auxiliary exhaust ports 13 is advanced. Or, if a power characteristic is wanted as plotted by the line 53, a control slide such as that shown in FIG. 8C may be used, in which uncovering of the auxiliary exhaust ports 13 is retarded. It is understood that the terms "advanced" or "retarded" relate to the uncovering time, in crank angle degrees of the two-stroke engine.

Figure 11:
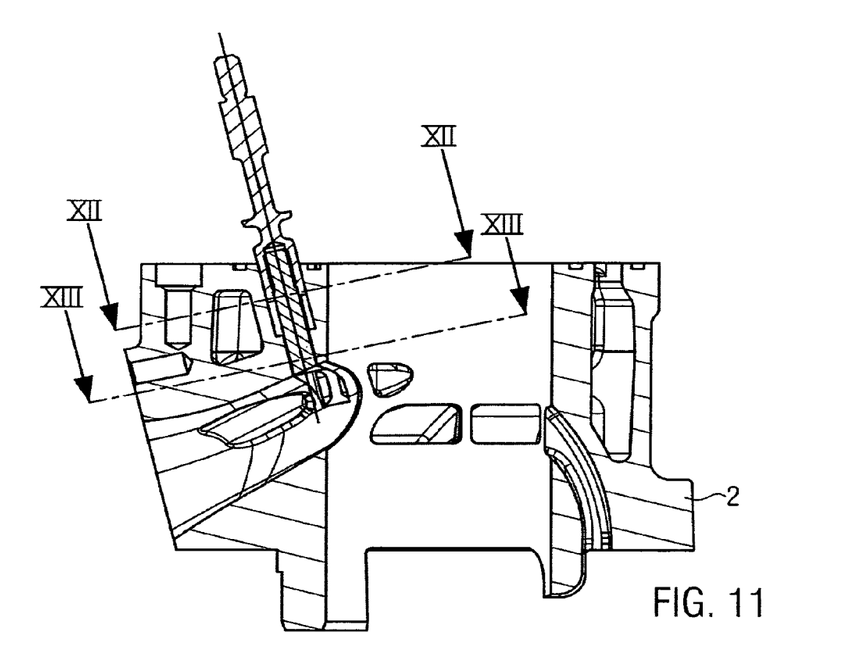
FIG. 11 is a cross section view through a certain portion of the cylinder according to the present disclosure, with further section lines indicated XII-XII and XIII-XIII.
Figure 12:
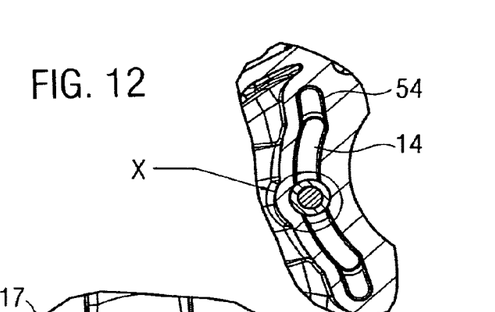
FIG. 12 is a scrap view of a portion of the section indicated XII-XII as shown in FIG. 11.
Figure 12A:
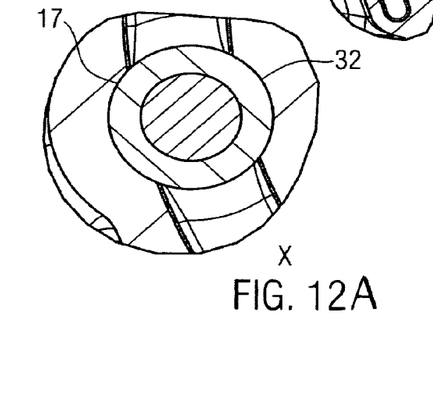
FIG. 12A is an enlarged or magnified view of the portion designated as detail X in FIG. 12.
Figure 13:
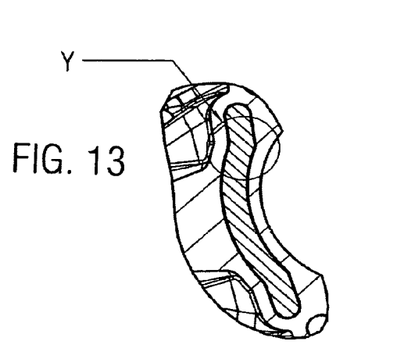
FIG. 13 is a scrap view of a portion of the section indicated XIII-XIII as shown in FIG. 11.
Figure 13A:
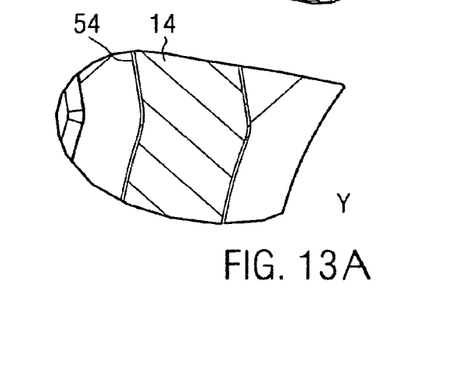
FIG. 13A is an enlarged or magnified view of the portion designated as detail Y in FIG. 13.
Figure 14:
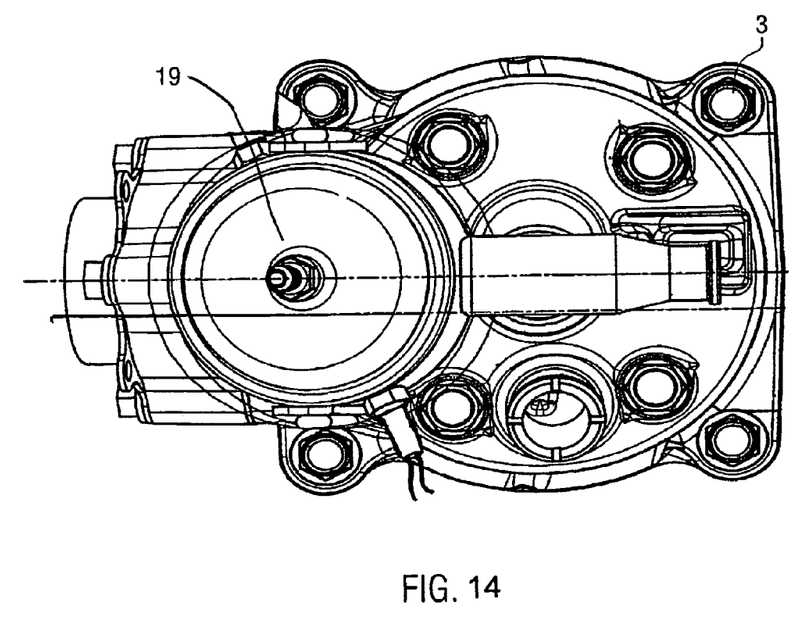
FIG. 14 is a plan view of the embodiment of the two-stroke engine similar to that seen in FIG. 3, showing an electromechanical actuator.

Turning now to FIG. 11, there is illustrated the cylinder 2 in section, with other perpendicular sections seen in FIG. 12 and FIG. 13. In this arrangement, FIG. 12 of the drawing shows section XII-XII as shown in FIG. 11 of the drawing through the accommodating hole 17, as well as the shell-shaped portion 32 of the slide stem 16. The recess 54 machined in the cylinder 2 is configured complementary in shape and size to the configuration of the control slide 14. The detail identified X in FIG. 12A of the drawing is illustrated on a magnified scale, and illustrates that there is provided a smoothly sliding seat between the shell-shaped portion 32 and the accommodating hole 17. The fitted, sliding engagement permits the shell-shaped portion 32, together with the accommodating hole 17, to assume the function of guiding the axially movable control slide 14. Meanwhile, the recess 54 is machined with substantially larger fits or looser tolerances relative to the control slide 14 and exercises minimal or no guiding function. Thus, because of a minimum rotation of the control slide 14 relative to the recess 54, the line contact occurs between the recess 54 and the control slide 14. This situation is also evident from magnified detail Y as shown in FIG. 13A, depicting a gap between the recess 54 and the control slide 14 whilst the detail X shows no such gap. These configurations permit machining the complicated geometry of the recess 54 with significantly larger tolerances, as is the case in pairing the accommodating hole 17 and shell-shaped portion 32—due to the fact that a hole is much simpler to drill with corresponding tight fits, than is the forming of a shape having complicated geometry as is the case with the recess 54.

It is understood that as regards all features of the invention not explained above in detail reference is expressly made to the claims and the drawing.

LIST OF REFERENCE NUMERALS 1 internal combustion engine
2 cylinder
3 cylinder head bolts
4 cylinder head
5 barrel
6 piston
7 coolant passageways
8 intake ports
9 supporting passageway
10 spark plug
11 spark plug connector
12 main exhaust port
13 auxiliary exhaust port
14 control slide
15 spring
16 slide stem
17 accommodating hole
18 accommodating hole
19 actuator
20 exhaust passageway
21 fluidly communicating connection
22 fluidly communicating connection
23 first pressure chamber
24 second pressure chamber
25 pressure conduit
26 main member
27 auxiliary member
28 longitudinal centerline, upright axis
29 recess
30 lower metering edge
31 pin-shaped portion
32 shell-shaped portion
33 plate-shaped counterhold
34 portions
35 cylindrical portion
36 portion
37 pressure diaphragm
38 pot-shaped housing member
39 partition
40 first piston
41 second piston
42 piston face
43 piston face
44 circlip
45 first expansion chamber
46 second expansion chamber
47 front face
48 rear face
49 start of uncover
50 end of uncover
51, 52, 53 power curves
54 recess
G gas flow direction out of the cylinder
K center of curvature Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all patents and publications cited above are hereby incorporated by reference.

What is claimed is:

1. A two-stroke internal combustion engine comprising a cylinder and a cylinder head releasably secured thereto, the cylinder having a curvature, and a main exhaust port and at least one auxiliary exhaust port coverable at least in part by control slide members actuatable by a slide stem arranged at an angle to a cylinder axis and axially actuated by an actuator, wherein:
   the control slide members are configured integrally with a common control slide, the common control slide being coupled to the slide stem; and
   the slide stem passes through the cylinder head.

2. The two-stroke engine as set forth in claim 1, wherein the control slide comprises:
   a main member having a center of curvature whereby the main member is configured curved substantially corresponding to the curvature of the cylinder; and
   auxiliary members configured integrally with the main member, and having substantially planar faces.

3. The two-stroke engine as set forth in claim 2, wherein the control slide member has an upright axis, and the main member and auxiliary members have differing respective height dimensions relative to the upright axis.

4. The two-stroke engine as set forth in claim 2, wherein the main member is between the auxiliary members and wherein each auxiliary member comprises:
   a front face;
   a rear face; and
   a curved surface facing away from the main member and connecting the front face and the rear face, the surface having a center of curvature between the front face and the rear face.

5. The two-stroke engine as set forth in claim 3, wherein the main member is between the auxiliary members and wherein each auxiliary member comprises:
   a front face;
   a rear face; and
   a curved surface facing away from the main member and connecting the front face and the rear face, the surface having a center of curvature between the front face and the rear face.

6. The two-stroke engine as set forth in claim 2, wherein an imaginary plane tangential to a front face of at least one auxiliary member located toward the main exhaust port intersects a second imaginary plane containing the center of curvature of the main member and a longitudinal centerline of the slide stem, the planes defining an angle in the range of approximately 55 degrees to approximately 90 degrees.

7. The two-stroke engine as set forth in claim 3, wherein an imaginary plane tangential to a front face of at least one auxiliary member located toward the main exhaust port intersects a second imaginary plane containing the center of curvature of the main member and a longitudinal centerline of the slide stem, the imaginary planes defining an angle in the range of approximately 55 degrees to approximately 90 degrees.

8. The two-stroke engine as set forth in claim 4, wherein an imaginary plane tangential to the front face of at least one auxiliary member located toward the main exhaust port intersects a second imaginary plane containing the center of curvature of the main member and a longitudinal centerline of the slide stem, the imaginary planes defining an angle in the range of approximately 55 degrees to approximately 90 degrees.

9. The two-stroke engine as set forth in claim 2, wherein a longitudinal centerline of the cylinder and a longitudinal centerline of the slide stem intersect to define an angle in the range of approximately 10 degrees to approximately 45 degrees.

10. The two-stroke engine as set forth in claim 9, wherein the longitudinal centerline of the cylinder and the longitudinal centerline of the slide stem intersect to define an angle in the range of approximately 13 degrees to approximately 16 degrees.

11. The two-stroke engine as set forth in claim 4, wherein a longitudinal centerline of the cylinder and a longitudinal centerline of the slide stem intersect to define an angle in the range of approximately 10 degrees to approximately 45 degrees.

12. The two-stroke engine as set forth in claim 5, wherein a longitudinal centerline of the cylinder and a longitudinal centerline of the slide stem intersect to define an angle in the range of approximately 10 degrees to approximately 45 degrees.

13. The two-stroke engine as set forth in claim 2, wherein the control slide is topped by a male threaded pin-shaped portion engageable with a female threaded shell portion of the slide stem.

14. The two-stroke engine as set forth in claim 4, wherein the control slide is topped by a male threaded pin-shaped portion engageable with a female threaded shell portion of the slide stem.

15. The two-stroke engine as set forth in claim 5, wherein the control slide is topped by a male threaded pin-shaped portion engageable with a female threaded shell portion of the slide stem.

16. The two-stroke engine as set forth in claim 2, wherein a top surface of the main member is upswept from at least one auxiliary member toward the slide stem.

17. The two-stroke engine as set forth in claim 4, wherein a top surface of the main member is upswept from at least one auxiliary member toward the slide stem.

18. The two-stroke engine as set forth in claim 6, wherein a top surface of the main member is upswept from at least one auxiliary member toward the slide stem.

19. The two-stroke engine as set forth in claim 2, wherein the auxiliary members protrude from the main member at any position in relation to the upright axis of the main member.

20. The two-stroke engine as set forth in claim 19, wherein the auxiliary members protrude below a bottom surface of the main member.

21. The two-stroke engine as set forth in claim 13, wherein the auxiliary members protrude from the main member at any position in relation to the upright axis of the main member.

22. The two-stroke engine as set forth in claim 16, wherein the auxiliary members protrude from the main member at any position in relation to the upright axis of the main member.

23. The two-stroke engine as set forth in claim 2, wherein the slide stem comprises a cylindrical portion slidably seated in a cylindrical recess in the cylinder.

24. The two-stroke engine as set forth in claim 1, wherein the actuator is disposed proximate to the cylinder head and is adapted for gas pressurization and coupling with the slide stem.

25. The two-stroke engine as set forth in claim 24, wherein the actuator comprises two pistons, with at least one piston face each, which actuate the slide stem to overcome a spring bias to uncover the exhaust ports, and wherein the piston faces of the two pistons are offset axially in relation to the direction of an actuating force.

26. The two-stroke engine as set forth in claim 24, wherein the actuator is actuatable by means of exhaust gas, and is in fluid communication with at least one of the exhaust ports.

27. The two-stroke engine as set forth in claim 24, wherein the actuator comprises a housing having two pressure chambers therein, juxtaposed by expansion chambers for venting or negative pressurizing.

28. The two-stroke engine as set forth in claim 27, wherein the actuator further comprises flexible pressure diaphragms disposed between pot-shaped housing members and a partition between the pressure chambers, the diaphragms supported by piston faces on a first and a second piston, and wherein the first and second pistons are coupled to move together always to actuate the slide stem.

29. The two-stroke engine as set forth in claim 28, wherein the pressure diaphragms comprise a methyl vinyl silicone rubber.

30. The two-stroke engine as set forth in claim 29, wherein the pressure diaphragms comprise fluorosilicone rubber fluoromethyl polysiloxane.

31. The two-stroke engine as set forth in claim 1, further comprising:
   a recess, defined in the cylinder and configured substantially complementary in shape and size to the control slide, for slidably receiving the control slide; and
   a hole, with the recess, for slidably receiving the slide stem.

32. The two-stroke engine as set forth in claim 1, wherein the cylinder has an upright axis, and wherein when the control slide is in a non-actuated position, a lower metering edge of the auxiliary exhaust port is disposed substantially level with a lower metering edge of the main member.

33. The two-stroke engine as set forth in claim 1, wherein the main member of the control slide comprises, at a lower metering edge thereof, a recess, and the recess defining an upsweep which is reduced in the direction of the main exhaust port such that, when the main exhaust port is uncovered, the lower metering edge is substantially flush with an upper edge of the main exhaust port.

34. The two-stroke engine as set forth in claim 1, wherein the actuator comprises a gas-pressurized piston which actuates the slide stem, the actuator being actuatable by exhaust gas of the engine.

35. The two-stroke engine as set forth in claim 1, wherein the actuator comprises a gas-pressurized piston which actuates the slide stem, the actuator being actuatable by a gas pressurized in a crankcase of the engine.

36. The two-stroke engine as set forth in claim 1, wherein the actuator is electromechanically powered.

37. The two-stroke engine as set forth in claim 1, wherein the engine is disposed on a motorcycle.

* * * * *